Nov. 25, 1969 K. M. FOSTER 3,480,415

AUTOMATIC SYSTEM FOR ALTERNATE FEED OF ACETYLENE GENERATOR

Filed Dec. 4, 1967 4 Sheets-Sheet 1

INVENTOR
KENNETH M. FOSTER

BY F B Henry
ATTORNEY

INVENTOR
KENNETH M. FOSTER
BY
ATTORNEY

INVENTOR
KENNETH M. FOSTER
BY F B Henry
ATTORNEY

Nov. 25, 1969 K. M. FOSTER 3,480,415

AUTOMATIC SYSTEM FOR ALTERNATE FEED OF ACETYLENE GENERATOR

Filed Dec. 4, 1967 4 Sheets-Sheet 4

INVENTOR
KENNETH M. FOSTER
BY FB Henry
ATTORNEY 3,480,415
AUTOMATIC SYSTEM FOR ALTERNATE FEED OF ACETYLENE GENERATOR Kenneth M. Foster, Arlington, N.J., assignor to Air Reduction Company, Incorporated, New York, N.Y., a corporation of New York Filed Dec. 4, 1967, Ser. No. 688,943
Int. Cl. C10h 15/14
U.S. Cl. 48—54 16 Claims

ABSTRACT OF THE DISCLOSURE

An alternate feed control system for an acetylene generator automatically fills in alternate sequence a pair of individual feed hoppers with calcium carbide as each in turn becomes exhausted during continuous production operation of the generator. A conveyor screw driven by a reversible motor, receives carbide from a large capacity storage facility and feeds from either one end of the screw or the other to a corresponding generator feed hopper, according to the direction of motor rotation. Each hopper has at its intake a fill-valve for admitting carbide from the active end of the conveyor during recharging, and for sealing the intake during acetylene generation. A valve at the exhaust end of the hopper isolates the hopper from the generator during the refilling and off-line periods. Control circuitry including timer mechanism, determines the direction and extent of motor-conveyor operation for hopper filling, and also coordinates operation of the storage supply feed, hopper valves and alternate cycling of the over-all generator feed system.

This invention relates generally to feed systems for acetylene generating plants capable of continuous production over long periods, and in particular to a feed control system for supplying calcium carbide in alternate sequence to a pair of feed hoppers of an acetylene generator for maintaining such continuous production of acetylene.

It has been proposed to produce acetylene in a generator unit having two feed hoppers by operating one hopper while the other which had become exhausted, is being refilled and put in readiness for a new cycle of operation. This method requires manual control and supervision of hopper transfer between the generator and feed system, hopper refilling, and certain related operations, including purging the feed system of air. An important and practical disadvantage of this method is that it requires the services of a skilled operative for initiating and supervising the proper transfer of exhausted and recharged hoppers respectively, from and to the product line. The operative after putting a fresh hopper on the line, must refill the exhausted hoper and ready it for prompt connection to the product line when the fresh hopper in turn is spent. In the event that the refilled hopped contains some air when it is connected to the generator, there is a possibility of an explosion due to the combustible nature of an air-acetylene mixture, with serious damage to the generating plant and injury to personnel. Accordingly, there is inherent in this type of control the possibility of human error that could lead to feed delays and significant interruptions in plant production of acetylene; also, the full-time services of a skilled operative materially increase the cost of acetylene production.

A principal object of this invention therefore is an improved, reliable and economical alternate-feed control system for continuous production of acetylene in a two-hopper generating plant.

Another object of the invention is an automatic timesharing feed control system for an acetylene generating plant, having reversible feed equipment for recharging in alternate sequence the corresponding generator hoppers without interruption in production as, in turn, each becomes exhausted.

In a specific embodiment of the invention, calcium carbide is fed from a large storage facility to the mid-portion of a horizontally positioned screw conveyor or the like, that connects at its opposite ends with the respective intakes of the generator hoppers. The conveyor has a reversible motor drive for separate and selective feed of carbide to either hopper, according to the direction of screw rotation. Each hopper at its intake has a fill-valve that is closed after the hopper is filled and remains closed during operation of the generator. An isolating valve at the hopper exhaust is closed when the hopper is refilled and off the line. The hopper valves, conveyor motor drives, and related control accessories, are controlled by electric circuitry including a timing device for determining the direction and extent of motor operation and effecting appropriate transfer of carbide feed to the generator in synchronism with hopper requirements. Thus, the feed control system of the invention automatically alternates the generator feed function between the two hoppers for maintaining continuous production.

The invention will be more fully set forth in the following description referring to the accompanying drawings and the features of novelty will be pointed out with particularity in the claims annexed to and forming a part of this specification.

Referring to the drawings.

Figure 1:
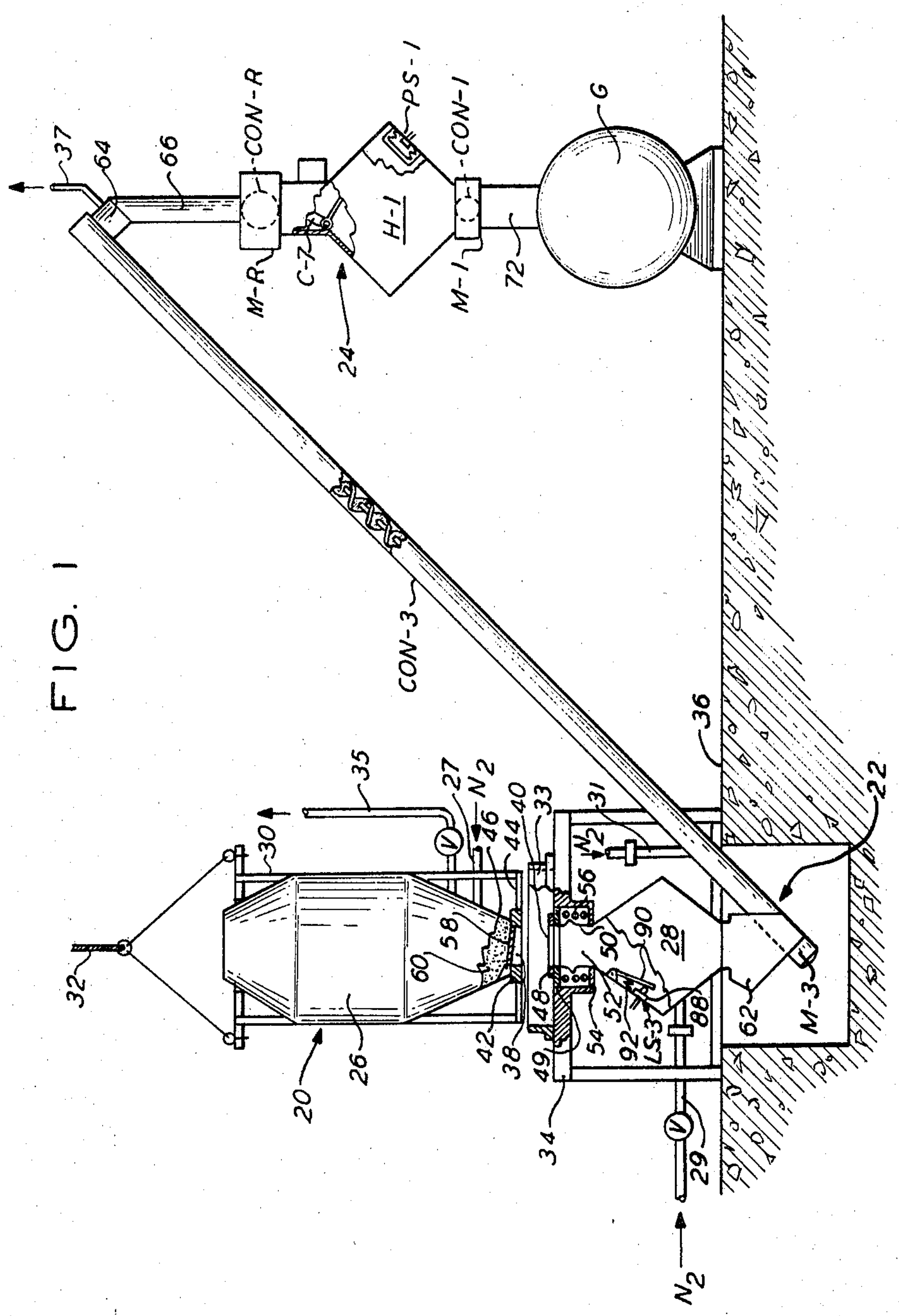
FIG. 1 is a view in elevation, partly in section, of an acetylene generating plant embodying the invention having a main storage feed facility and a generator having two feed hoppers with alternate carbide feed equipment.

The acetylene generating plant shown generally in FIG. 1 comprises essentially a large-capacity storage facility 20 for calcium carbide, a main conveyor system 22 for removing carbide from storage as needed, and a feed distribution system 24 for continuous supply of conveyor carbide to an acetylene generator G. The generator per se is not a part of the present invention and is represented but without limitation thereto, as of the so-called "wet-generation" type wherein carbide reacts with an excess of water within a tank to form acetylene gas.

The storage facility 20 has capability for feeding bulk carbide to the conveyor system for continuous operation of the generator as long as desired. In practice, a carbide shipping container 26 of about 5-ton capacity is lifted into feed position over a storage receiving hopper 28 that in turn, feeds into the main conveyor system 22. The shipping container 26 of well-known type, is mounted in a supporting frame 30 for handling by an overhead hoist at 32; and when in feed position it seats within a guide 33 on a structural support 34 that is mounted on a foundation base 36. The receiving hopper 28 is suitably mounted within the support 34 between the lower feed end of the container 26 and the intake end of the conveyor system.

A simple container-to-hopper feed connection at the vertically aligned passages 38 and 40 between the container and hopper respectively, includes a pair of sealing rings, one being a collar 42 that is secured to the bottom section 44 of the frame 30 and joined in concentric relation to the converging outlet end 46 of the container. The other ring is a resilient gasket 48 of rubber or the like, that is fastened to an offset flange 49 on the upper end of a compressible tube 50. This tube forms an intake passage or throat 52 for the receiving hopper and is rigidly secured at its lower part to an annular flange 54 depending from the main support 34. A compression spring 56 is seated between the fixed support flange 54 and the gasket supporting flange 49 secured to the relatively free end of the tube 50. Accordingly, as the carbide container 26 and its carrying frame are lowered onto the main support 34, the container collar 42 initially engages the gasket 48; the subsequent and final seating movement of the container compresses the tube 50 and spring 56 as well as the gasket 48, so that a tight seal is automatically established and maintained by the weight of the storage container itself. Mechanical coupling and uncoupling means requiring separate manipulation is therefore unnecessary for readily replacing an exhausted container by a filled container. A gate or trap-door type valve 58 having suitable actuating means (not shown) controls gravity flow of the carbide particles 60 into the receiving hopper 28.

Carbide from the receiving hopper is fed as required through a hopper exhaust section 62 to the main conveyor system 22 that comprises essentially a screw or equivalent type conveyor CON–3 operation by a motor M–3 at the conveyor base. The conveyor is elevated at an angle of about 45 degrees and lifts the carbide to a point well above the feed distribution system 24 for gravity flow thereto. The elevated exhaust end of conveyor CON–3 connects through a vented adapter tube 64 with a vertical "pant leg" chute 66. The chute, in turn, feeds into the mid-section of a horizontally positioned distribution conveyor CON–R that is located in overhanging bridging relation with respect to two generator feed hoppers H–1 and H–2, FIGS. 1 and 2. The opposite ends of this conveyor have discharge openings 68 and 70 that are vertically aligned with the intake passages of the hoppers H–1 and H–2 respectively, for supplying carbide thereto. The conveyor CON–R also shown as of the rotating screw or worm type, is driven in either one direction or the other, by a reversible motor M–R for supplying in alternate sequence carbide to the generator hoppers. When one hopper, say H–1, has been filled by CON–R and is connected for a normal feed run to the generator, FIG. 3, the other hopper H–2 now being exhausted, the motor M–R is operated in reverse direction so that carbide from the central chute 60 is conveyed by CON–R to the empty hopper H–2. When hopper H–2 is filled and properly conditioned as explained below, it is ready for transfer connection to the generator for a normal feed run as the hopper H–1 in turn becomes exhausted and is disconnected from the generator. Carbide from the main conveyor CON–3 is thereby supplied and distributed alternately to CON–R to the generator hoppers in an uninterrupted transfer operation, thereby providing for continuous long-period operation of the generating plant.

As has been mentioned above, the filling, conditioning and alternate feed transfer of the generator hoppers H–1 and H–2, and the coordination of controls with supply of carbide from the main conveyor system 22, must meet the principal plant requirements of operation continuity and safety. Such requirements include ensuring gas venting and pressurizing of each hopper during its off-line period, proper relationship of generator pressure and feed hopper pressure and an adequate carbide supply in the feed hopper for a normal feed run. To this end, the invention provides an automatic control system that operates the various conveyor motors, hopper gas and carbide valves, etc. according to a pre-selected sequential program that ensures proper and timely conditioning of the generator hoppers and alternating feed to the generator for continuous acetylene production.

Figure 2:
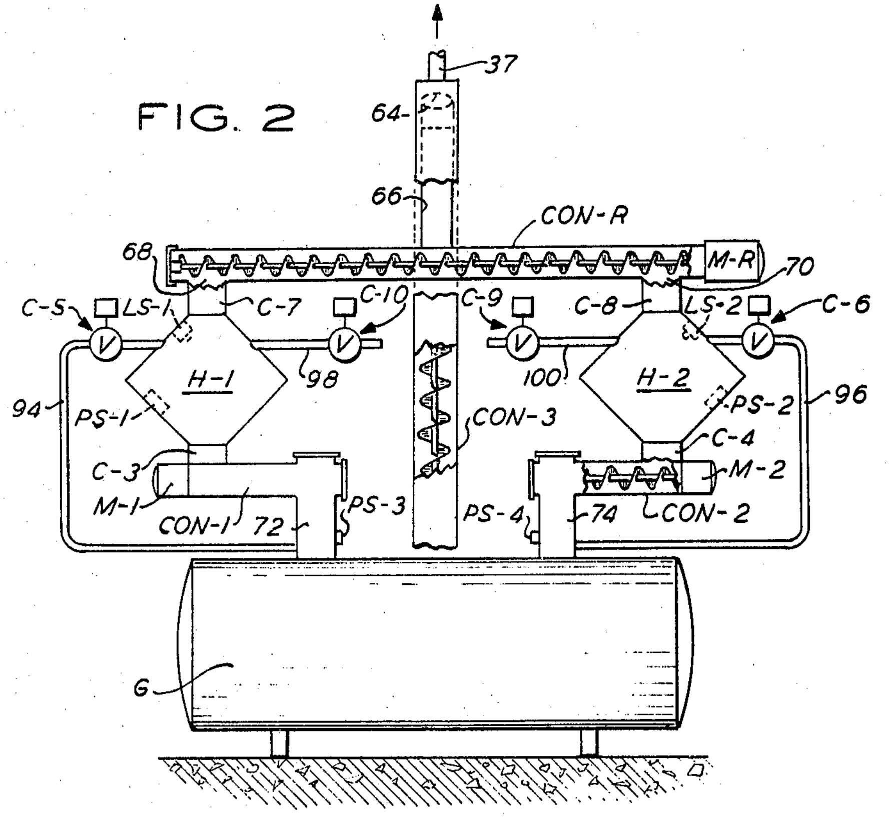
FIG. 2 is a side view in elevation, partly in section, of the generator hopper feed arrangement shown in FIG. 1.
Figure 3:
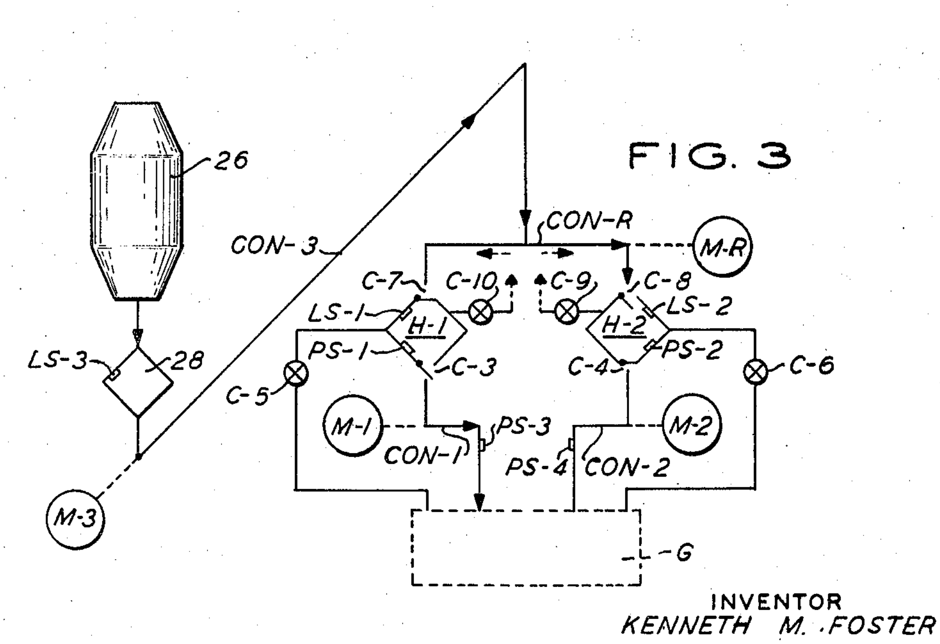
FIG. 3 is a schematic flow-line diagram indicating primary control elements of the alternate feed arrangement.
Figure 4:
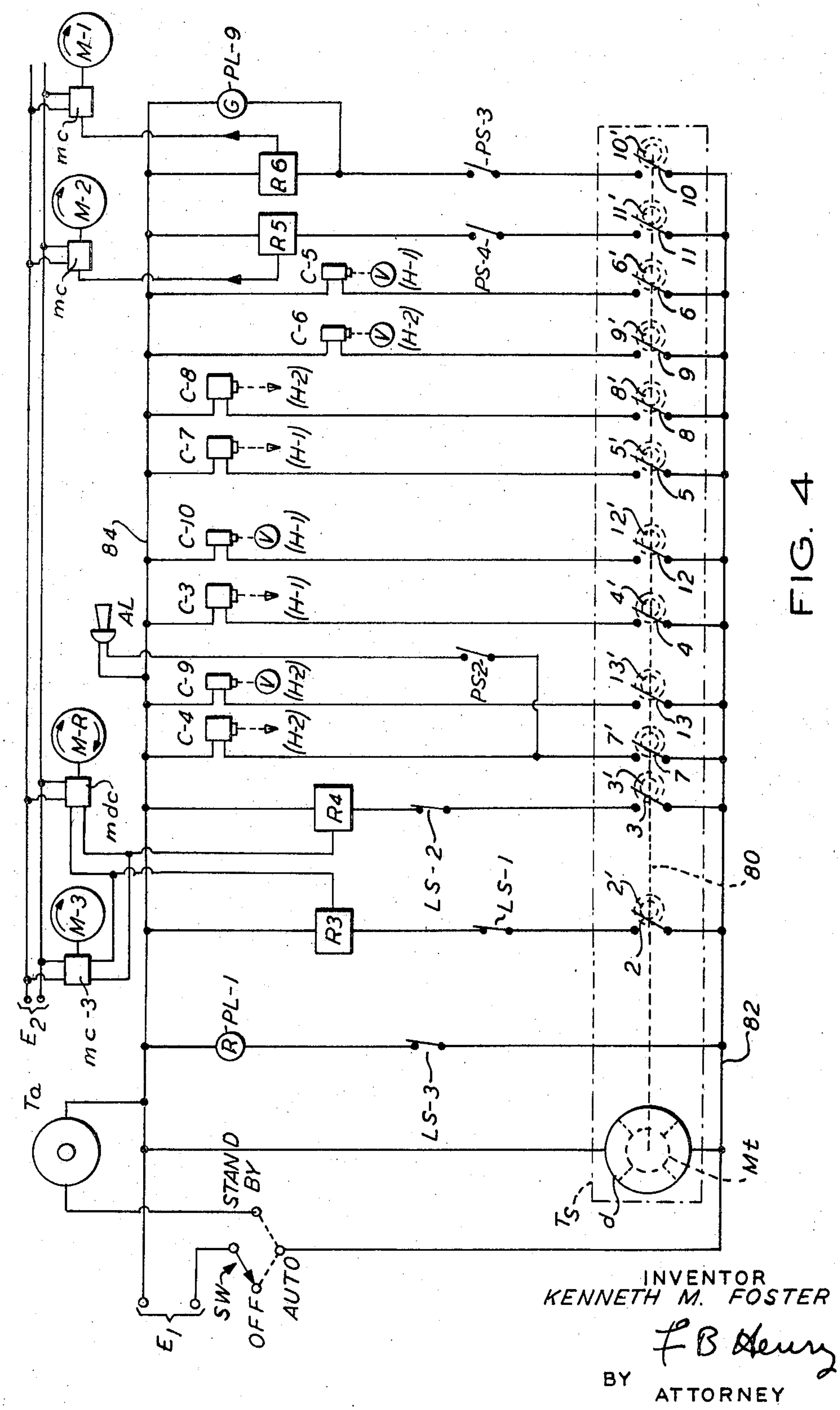
FIG. 4 is a diagram of the timer control circuitry and system components.

Referring first to FIGS. 2 and 3, the primary control components for the hoppers H–1 and H–2 comprise the intake control or fill values at C–7 and C–8 respectively, and corresponding discharge control valve at C–3 and C–4. These valves and their actuators are not shown in detail, it being sufficient to state that they may be of the trap-door type such as the storage container discharge valve 58, FIG. 1. The valve actuators may be of any suitable type and are indicated in FIG. 4 as electric solenoids. The hopper fill valves C–7 and C–8 control gravity flow of carbide from the discharge openings 68 and 70 respectively, at opposite ends of the reversible conveyor CON–R. The discharge valves C–3 and C–4 control feed of the hopper carbide to respective generator feed conveyors CON–1 and CON–2. Each conveyor, as shown in more detail at CON–2, FIG. 2, feeds the carbide horizontally from its hopper to a vertical chute, 72 and 74, that in turn empties into the generator. The feed conveyors are driven by electric motors M–1 and M–2, respectively, the speeds of which are regulated for determining proper rate of carbide feed to the generator. The general sequence operation of the hopper valves for alternate filling and generator feeding will be apparent from a brief description of the single line, flow diagram of FIG. 3. Assuming that the hopper H–1 is filled with carbide and on a feed run, its fill valve C–7 is closed for isolating the hopper from CON–R and maintaining hopper pressure. The discharge valve C–3 is open for admitting carbide to the slowly rotating conveyor CON–1 that is feeding the generator. In the meantime, the hopper H–2 refilling operation consists of closing the discharge valve C–4, opening the fill-valve C–8 and reversing the motor M–R for driving the conveyor CON–R in feed direction toward the right, as viewed. The main conveyor feed from CON–3 to CON–4 for hopper requirements is coordinated by appropriate operation of motor M–3.

FEED SYSTEM PROGRAM CONTROL

Referring specifically to FIG. 4, the feed system control circuitry is governed by a sequential timer T*s* having a plurality of control switches 2, 3, etc. that are separately operated by appropriately contoured cams 2′, 3′, etc. mounted on a common operating shaft 80 of the timer. The time motor M*t* is connected through a main system switch SW across the line 82, 84 of a voltage source $E_1$, and drives the shaft 80 through reduction gearing (not shown) at a very slow rate, in the present instance ½ revolution per hour. Each cam is designed to operate the corresponding switch at a time and for a period depending on the function of that switch in a 2-hour program. One terminal of each switch is connected to a line conductor 82 leading from the automatic control contact AUTO of the main switch SW, and the other terminal is connected by way of the controlled system component as hereinafter described, to the opposite line conductor 84. Further description of the timer per se is unnecessary for a complete understanding of the invention, a commercial reference to the type in question being "'HF' series Polypulse Program Timer," Eagle Signal Co., Moline, Ill.

The system components and related equipment controlled by the sequential timer T*s*, FIG. 4, will be briefly described. In each hopper are located a level switch (LS) responsive to carbide levels representing filled and less-than-filled conditions of the hopper, and a pressure switch (PS) responsive to a predetermined gauge pressure (above atmospheric) in the hopper. The level switches LS–1 and LS–2 for the H–1 and H–2 hoppers respectively, may take various forms, the receiving hopper level switch LS–3, FIG. 1, being a simply illustrated example. A micro-switch or the like 88 having one or more poles as required, is operated by a pivoted vane 90 that is subject to lateral pressure as the carbide level raises. This pressure is opposed by biasing spring 92 that is overcome when the carbide reaches the "filled" level for operating the switch.

The hopper pressure switches PS–1 and PS–2 for the H–1 and H–2 hoppers may be of the well-known sealed bellows type as indicated at PS–1, FIG. 1. The free end of the bellows actuates, depending on hopper internal pressure, a switch member for opening and closing the contacts. In addition to the hopper pressure switches, generator pressure switches PS–3 and PS–4 are suitably located within the exhaust chutes 72 and 74.

The hopper fill and discharge gate valves C–7, C–8 and C–3, C–4, have as mentioned above electric solenoid actuators of known type. For hopper venting and pressurizing as described below, H–1 and H–2 are connected to pressure lines 94 and 96 that are controlled by solenoid operated gas valves C–5 and C–6 respectively, and to venting pipes 98 and 100, also controlled by similar gas valves C–10 and C–9, respectively.

CYCLE OPERATION

Figure 5:
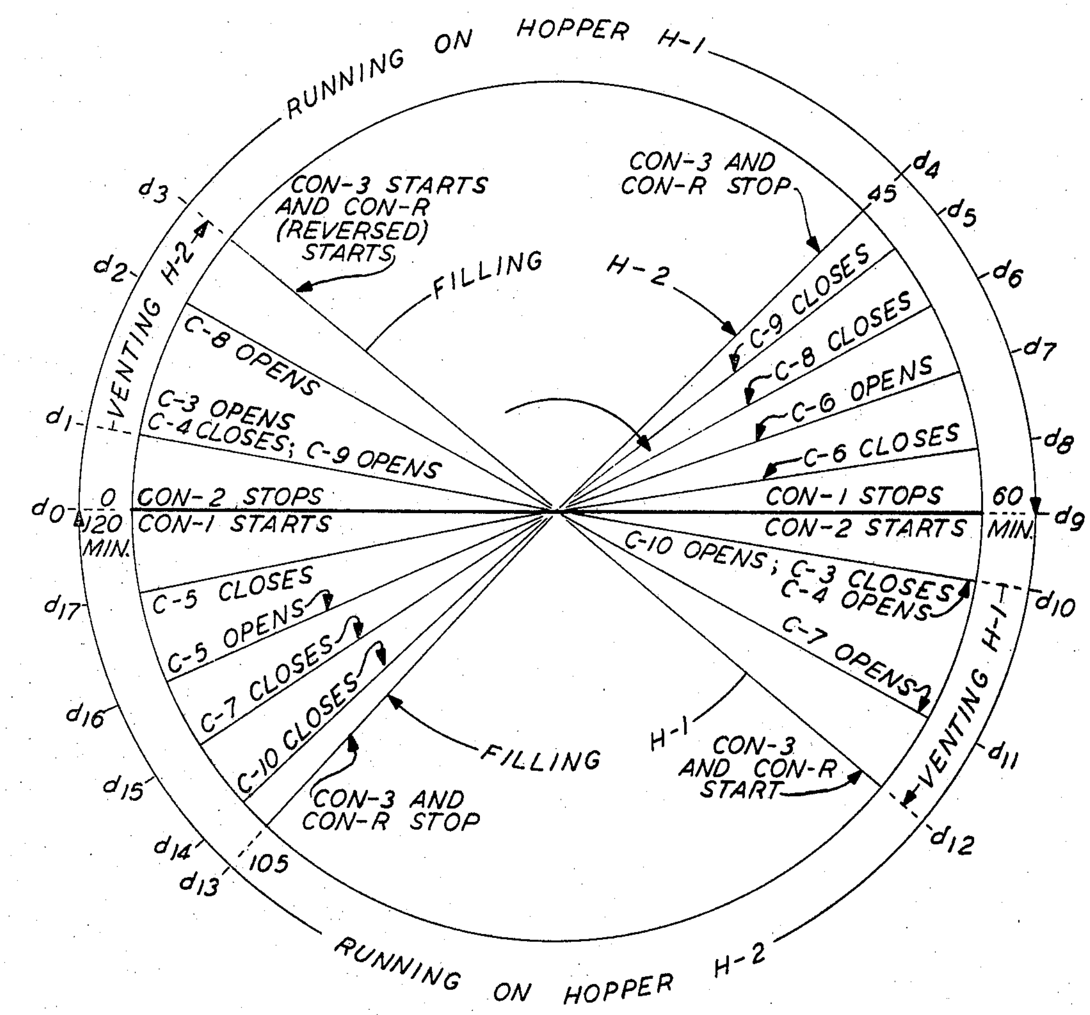
FIG. 5 is a circle diagram illustrating the sequence control positions of the timer dial.

The program sequence is shown by the circle diagram, FIG. 5, that represents the timer dial *d*, FIG. 4, one revolution of which completes a full cycle of H–1 and H–2 alternate feed runs.

Assuming that in starting this cycle the zero dial setting $d_0$, FIG. 5, represents the hopper H–1 as filled and ready for a feed run, and the hopper H–2 as exhausted, i.e. at the end of its run, the timer shaft cams 11$^1$ and 10$^1$ are positioned for opening the switch 11 and closing the switch 10, respectively. Subject to closed positions of pressure switches PS–4 and PS–3 representing proper generator pressure, FIG. 2, the relays R–6 and R–5 are actuated for stopping and starting respectively, the CON–2 conveyor motor M–2 and the CON–1 conveyor motor M–1. These motors are connected to a voltage source $E_2$, such as a power line, FIG. 4, and are controlled by the relays in conventional manner through motor controls *mc*. Accordingly, the H–2 discharge conveyor CON–2 stops feeding carbide to the generator and concurrently the H–1 discharge conveyor CON–1 starts feeding.

Shortly thereafter (dial position $d_1$), the cams 4$^1$ and 7$^1$ are positioned for simultaneously operating the corresponding switches 4 and 7; switch 4 is opened for opening the H–1 discharge valve C–3, and switch 7 is closed for closing the H–2 discharge valve C–4. Carbide from hopper H–1 is now free to flow into the moving conveyor CON–1 as H–1 starts its normal feed run.

The conditioning and refilling procedures for hopper H–2 start with closing of the discharge valve C–4 above, and concurrent opening of the gas venting valve C–9 by the cam switch 13. The hopper is vented directly to atmosphere prior to the start of and throughout the refilling operation.

Refilling of H–2 (dial $d_2$) with opening of the fill-valve C–8 through cam switch 8; shortly thereafter (dial $d_3$) carbide starts flowing into H–2 from the reversible conveyor CON–R at discharge opening 70 as the conveyor motor M–R is energized for such movement through the direction relay R4 and the cam switch 3. At the same time ($d_3$) the main conveyor CON–3 starts feeding to CON–R from storage as the conveyor motor M–3 is energized through a uni-direction control *mc*–3 that is responsive to either of the alternately controlled relays R3 and R4 of the M–R motor control circuitry. Separate start and stop controls for M–3 apart from M–R are not necessary in this instance as feed of the main conveyor CON–3 into the reversible conveyor CON–R is, of course, required only when the latter is filling H–1 or H–2, as the case may be. The concurrent operation of the motors M–3 and M–R is subject as indicated, to the condition of the respective hopper level switches LS–1 and LS–2; i.e. at "filled" position, the corresponding level switch is open, thereby indicating completion of hopper filling and causing operation of the relay R3 or R4, as the case may be, and consequent de-energization of both motors M–3 and M–R and stopping of the corresponding conveyors CON–3 and CON–R.

After approximately one quarter hour (dial, $d_4$), hopper H–2 is filled as evidenced either by opening of its level switch LS–2, or timed opening of cam switch 3, thereby stopping the conveyor motors M–3 and M–R. The final conditioning consists of closing and pressurizing the newly filled hopper. The venting pipe 100 is first closed (dial, $d_5$) by the gas valve C–9 through cam switch 13; shortly thereafter (dial, $d_6$) the hopper fill-valve C–8 is closed through cam switch 8. The hopper is now tightly sealed and in readiness for pressurization from the generator for bringing the hopper pressure up to the generator pressure. For this purpose, the valve C–6 in the pressure line 96 is opened through cam switch 9 (dial, $d_7$), and after a short preiod (dial, $d_8$) of pressurization, the valve recloses. The hopper H–2 is now filled, conditioned and ready for a new feed run.

The hopper H–1, now at the end (dial, $d_9$) of its one-hour run is taken off the line by stopping the discharge conveyor motor M–1 through the relay R6 and cam switch 10. Concurrently, the conveyor CON–2 of the fresh H–2 hopper starts as its motor M–2 is energized through relay R5 and cam switch 11. Both feed-rate conveyor motors M–1 and M–2 are subject to the generator pressure switches PS–3 and PS–4 that open only when the pressure in the generator rises above a given value, or preset point. Assuming normal generator pressure and consequently closure of the pressure switches, conveyor CON–2 starts and continues to feed the generator from H–2 for the new feed run. Shortly after completion of the H–1 run, (dial, $d_{10}$) the discharge valve C–3 or H–1 closes in preparation for hopper refilling, etc. and the discharge valve C–4 of H–2 opens for starting the new feed run.

The conditioning and refilling of hopper H–1 is essentially a duplicate of the H–2 procedure described above. Venting is initiated (dial, $d_{20}$) by opening of vent valve C–10 through cam switch 12, and is continued after opening of the H–1 fill-valve C–7 through cam switch 5 (dial, $d_{11}$). until refilling starts (dial, $d_{12}$). At the start of refilling, CON–3 and CON–R start, this time under the control of the direction relay R3 through cam switch 2. The CON–3 and CON–R motors both stop (dial, $d_{13}$) after the refilling period, as the relay R3 is de-energized by the H–1 level switch LS–1. The vent valve C–10 is reclosed (dial, $d_{14}$) through cam switch 12, fill valve C–7 is closed (dial, $d_{15}$) through cam switch 5 and pressurization is completed by opening (dial, $d_{16}$) and later closing (dial, $d_{19}$) the gas pressure valve C–5 through cam switch 6. Hopper H–1 accordingly, is now conditioned and refilled for connection to the line for a new feed run as the hopper H–2 completes (dial, $d_0$) its run. Preferably, the duration of the feed run is related to the feed rate so that the feed run ends before the hopper is entirely empty.

The hopper level switches LS–1 and LS–2 and the generator pressure switches PS–3 and PS–4 function as limit controls and safety checks for controlling the relays of the respective conveyor motor circuits, FIG. 4. When a hopper is filled, the corresponding level switch opens the motor relay circuit (R3, R4) for stopping the main and hopper feed motors M–3 and M–R. As the generator pressure rises slightly above set-point during conveyor rate feed, the generator pressure switches cut out the then operating conveyor (CON–1 or CON–2) for stopping further feed of carbide to the generator until the pressure drops again to set-point.

The H–1 and H–2 hopper runs described above, make up a complete 2-hour cycle of the timer operation. This cycle can be repeated as many times as desired for continuous acetylene production, subject only to periodic servicing of the generator and plant shut-down, as for week-end periods. For temporary shut-down or standby of the plant, the main switch SW is moved to the "STANDBY" position, thereby disconnecting the timer T*s* and automatic feed control circuits, and connecting to the line $E_1$ a generator agitator timer T*a*. This timer controls in well known manner a motor (not shown) for periodically agitating the sludge remaining in the generator, thereby preventing it from "freezing."

In practice, certain key or critical operations in the cycle are indicated by signal lamps or the like, typical examples being (a) a green pilot lamp PL–9 for indicating normal generator pressure (PS–3) during feed from the H–1 hopper discharge conveyor CON–1, (b) a red pilot light PL–1 for indicating low carbide (LS–3) in the receiving hopper 28 of the storage facility and probable exhaustion of the bulk container 26, and (c) an audible alarm AL responsive to the H–2 pressure switch PS–2 for indicating excessively high pressure in the hopper during the intended venting period; other visual and/or audible signals may be used as preferred in the circuitry of FIG. 4.

Air purging of the bulk container and main conveyor system by nitrogen under pressure, although not included in the automatic control cycle described above because it is less frequently required, is provided as generally indicated in FIG. 1. The nitrogen $N_2$ may be admitted as required by manually controlled lines 27, 29, and 31 to the bulk container 26, receiving hopper 28 and main conveyor CON–3, respectively. The container is vented by the line 35, and the receiving hopper and main conveyor are vented at the top of the conveyor by vent pipe 37. Accordingly, the carbide fed by the main conveyor system into the reversible hopper feed conveyor CON–R is for practical purposes free of air.

The invention is therefore seen as constituting an improved system for automatically regulating and controlling the supply of carbide for continuous feed to an acetylene generating plant having two feed hoppers that function in consecutive alternate sequence.

It should be understood that this invention is not limited to specific details of construction and arrangement thereof herein illustrated, and that changes and modifications may occur to one skilled in the art without departing from the spirit of the invention.

What is claimed is:

1. A system for feeding calcium carbide to an acetylene generating plant having a pair of feed hoppers for continuous production, comprising, (a) a carbide storage facility having a supply outlet, (b) distributing means fed from the supply outlet and having alternative discharge outlets for feeding carbide to the generator feed hoppers respectively, (c) reversible motive means connected to the distributing means for causing flow of carbide through one or the other of the discharge outlets to a respective hopper, (d) and control means for alternately reversing the motive means for filling respectively, each hopper in alternate sequence.

2. A system as specified in claim 1 wherein the storage facility comprises a bulk carbide container seated on a supporting frame, a receiving hopper mounted directly beneath the container, and a feed coupling between the container and hopper consisting of concentrically aligned sealing rings at the outlet and intake openings of the container and hopper respectively, one of the rings having a flexible connection with the hopper for resiliently yielding under container weight when the rings engage for making a tight seal.

3. A system as specified in claim 1 wherein the distributing means is a reversible conveyor, and carbide from the storage supply outlet is fed to the conveyor at a point between the discharge outlets.

4. A system as specified in claim 3 wherein the discharge outlets are at the opposite ends respectively of the reversible conveyor, and the storage supply carbide is fed to the conveyor at the mid-portion thereof for selective discharge at one of the end outlets.

5. A system as specified in claim 4 wherein the conveyor is horizontally positioned in bridging relation to the respective generator hoppers, and each hopper intake is vertically aligned with a corresponding discharge outlet of the conveyor.

6. A system as specified in claim 4 wherein the storage supply outlet includes a uni-directional conveyor extending from the storage facility at a vertical angle for lifting carbide to the mid-portion of the reversible conveyor.

7. A system as specified in claim 1 wherein the control means used to alternately reverse the motive means includes a program timer for monitoring in consecutive sequence the individual filling of each hopper.

8. A system as specified in claim 7, wherein the reversible motive means is an electric motor energized according to operation of the program timer for driving the distributing means in one hopper feed direction or the other.

9. A system as specified in claim 4 wherein each hopper has a circuit controller that is responsive to carbide level representing a filled hopper, and the motor is subject to de-energization by either the circuit controller or program timer when a filled hopper condition is indicated.

10. A system as specified in claim 8 wherein carbide from the storage facility is fed by a motor-driven conveyor to the hopper feed distributing means, and the program timer controls the motor for conveyor operation concurrent with that of the reversible motor.

11. A system as specified in claim 7 wherein each hopper has a fill-valve for admitting carbide from the respective discharge outlet of the distributing means and a discharge valve for feed of carbide to the generator, and the program timer controls the opening and closing of the respective valves in relation to operation of the reversible motive means for alternate filling of the hoppers.

12. A system as specified in claim 11, wherein the program timer causes de-energization of the motive means and closing of the respective fill valve at the end of a hopper filling period, and subsequently causes opening of the discharge valve for normal feed of carbide to the generator.

13. A system as specified in claim 11 wherein each hopper at its discharge valve is connected to a rate discharge motor-driven conveyor feeding to the generator, the program timer causing starting and stopping of each conveyor in functional relation to the opening and closing of the respective discharge valve, and wherein circuit controlling means responsive to predetermined generator gas pressure controls the operation of the discharge conveyor motors.

14. A system as specified in claim 11 wherein the program timer causes closing of the respective discharge valve of a feed hopper at the end of a hopper feed period and subsequently causes opening of the fill valve and energization of the motive means for refilling the hopper.

15. A system as specified in claim 14 wherein each hopper has gas venting means and gas pressurizing means and the program timer selectively controls both means for venting a respective hopper immediately prior to filling thereof and for closing the hopper fill valve and pressurizing the hopper after filling thereof.

16. A system as specified in claim 15, wherein the program timer has a plurality of selectively operable switches for controlling the respective valves associated with each hopper and for controlling the reversible motive means, and the timer switches operate within a cycle consisting of a generator feed run of a first hopper coincident with venting, refilling and pressurizing of the second hopper, and a generator feed run of the second hopper coincident with venting, refilling and pressurizing of the first hopper.

References Cited

UNITED STATES PATENTS

| | | | |
|---|---|---|---|
| 2,457,894 | 1/1949 | Hooper | 48—38 |
| 3,090,685 | 5/1963 | Pechtold et al. | 48—54 |

FOREIGN PATENTS 548,855 11/1957 Canada.

MORRIS O. WOLK, Primary Examiner

J. D. OLSEN, Assistant Examiner

U.S. Cl. X.R.

23—282; 48—58